US008824167B2

(12) United States Patent
Hughes et al.

(10) Patent No.: US 8,824,167 B2
(45) Date of Patent: Sep. 2, 2014

(54) SELF SYNCHRONIZING POWER CONVERTER APPARATUS AND METHOD SUITABLE FOR AUXILIARY BIAS FOR DYNAMIC LOAD APPLICATIONS

(75) Inventors: Rodney Alan Hughes, Tacoma, WA (US); Reid Adriance, Mill Creek, WA (US); Bertrand Nkei, Redmond, WA (US); Jay Allen Kuehny, Sammamish, WA (US)

(73) Assignee: Crane Electronics, Inc., Redmond, WA (US)

( * ) Notice: Subject to any disclaimer, the term of this patent is extended or adjusted under 35 U.S.C. 154(b) by 649 days.

(21) Appl. No.: 13/185,217

(22) Filed: Jul. 18, 2011

(65) Prior Publication Data
US 2013/0020867 A1 Jan. 24, 2013

(51) Int. Cl.
*H02M 3/335* (2006.01)
*H02M 1/00* (2006.01)
*H02J 3/12* (2006.01)

(52) U.S. Cl.
CPC .. *H02M 3/33507* (2013.01); *H02M 2001/0019* (2013.01); *H02M 2001/0006* (2013.01); *H02J 3/12* (2013.01)
USPC ................................ 363/17; 363/98; 323/282

(58) Field of Classification Search
USPC ............. 363/16–20, 25, 26, 21.02, 21.13, 37, 363/41, 89, 97, 98; 323/222, 235, 282–290, 323/299, 311–316, 251
See application file for complete search history.

(56) References Cited

U.S. PATENT DOCUMENTS

| | | | |
|---|---|---|---|
| 4,128,868 A * | 12/1978 | Gamble | 363/26 |
| 4,635,002 A | 1/1987 | Riebeek | |
| 4,743,835 A | 5/1988 | Bossé et al. | |
| 4,992,919 A * | 2/1991 | Lee et al. | 363/17 |
| 5,418,502 A | 5/1995 | Ma et al. | |
| 5,430,640 A * | 7/1995 | Lee | 363/127 |
| 5,521,807 A | 5/1996 | Chen et al. | |
| 5,631,822 A | 5/1997 | Silberkleit et al. | |
| 5,694,303 A | 12/1997 | Silberkleit et al. | |
| 6,043,705 A | 3/2000 | Jiang | |
| 6,137,373 A | 10/2000 | Mori | |
| 6,157,180 A * | 12/2000 | Kuo | 323/282 |
| 6,472,852 B1 | 10/2002 | Lethellier | |
| 6,643,151 B1 * | 11/2003 | Nebrigic et al. | 363/59 |
| 6,697,955 B1 | 2/2004 | Malik et al. | |

(Continued)

OTHER PUBLICATIONS

Hume et al., "Power Converter Apparatus and Method With Compensation for Light Load Conditions," Office Action mailed Nov. 6, 2013, for U.S. Appl. No. 13/185,142, 11 pages.

(Continued)

*Primary Examiner* — Rajnikant Patel
(74) *Attorney, Agent, or Firm* — Seed IP Law Group PLLC (57) ABSTRACT

An auxiliary power supply or bias voltage supply employs a step up switch mode DC/DC power converter topology to supply regulated bias supply voltages, from very low input voltages (e.g., less than 2V). The supply will synchronize to dynamic loads making it particularly useful in circuits with periodic high peak current power demands, for example, gate drive circuits employed in regulated switched mode power converters. When unladed, the supply will efficiently adjust its cycle period to the minimum required to maintain the desired boosted output voltage. Additional transformer windings or a charge pump may be used to generate additional vias voltage sources.

22 Claims, 7 Drawing Sheets

(56) References Cited

U.S. PATENT DOCUMENTS

| | | | |
|---|---|---|---|
| 6,998,901 | B2 | 2/2006 | Lee |
| 7,061,212 | B2 | 6/2006 | Phadke |
| 7,515,005 | B2 | 4/2009 | Dan |
| 7,579,901 | B2 | 8/2009 | Yamashita |
| 7,742,318 | B2 | 6/2010 | Fu et al. |
| 8,067,992 | B2 | 11/2011 | Chen et al. |
| 8,358,118 | B2 | 1/2013 | Chen et al. |
| 8,552,589 | B2 | 10/2013 | Ghosh et al. |
| 2002/0071300 | A1 | 6/2002 | Jang et al. |
| 2006/0039172 | A1 | 2/2006 | Soldano |
| 2006/0132105 | A1 | 6/2006 | Prasad et al. |
| 2006/0220629 | A1 | 10/2006 | Saito et al. |
| 2008/0031014 | A1 | 2/2008 | Young |
| 2009/0174381 | A1 | 7/2009 | Ojanen et al. |
| 2009/0237057 | A1 | 9/2009 | Dishman et al. |
| 2009/0256547 | A1 | 10/2009 | Akyildiz et al. |
| 2009/0302775 | A1 | 12/2009 | Alexandrov |
| 2010/0014330 | A1 | 1/2010 | Chang et al. |
| 2010/0117715 | A1 | 5/2010 | Ariyama |
| 2011/0241637 | A1 | 10/2011 | Parker |

OTHER PUBLICATIONS

International Search Report, mailed Oct. 14, 2011, for PCT/US2011/030778, 3 pages.

Kristjansson et al., "Solutions to Today's Low Voltage Power Design Challenges Using High-Efficiency, Non-Isolated Point of Load Converters: A Discussion of the Interpoint™ MFP Series™ Point of Load Converter," Crane Aerospace & Electronics, Power Solutions—Interpoint Products, Redmond, WA, Oct. 2011, Revised Jan. 2012, 25 pages.

Merriam-Webster, "Directly," retrieved from http://www.merriam-webster.com/dictionary/directly, on Nov. 6, 2012, 1 page.

Xing et al., "Power System Architecture with Back-Up Power for Servers," ERC Program of the National Science Foundation, 5 pages.

"Application Guide: Theory of Operation," MicroPower Direct, URL= http://micropowerdirect.com/PDF%20Files/Application%20Notes/Power%20Supply%20Theory%20of%20Operation.pdf, download date Apr. 18, 2012, 6 pages.

"Buck converter," URL= http://en.wikipedia.org/wiki/Buck_converter, download date Jun. 23, 2011, 14 pages.

"Maximum Flexible Power (MFP) Single Output Point of Load: Technical Preview—3-6 VDC in, 7 Amp, Non-Isolated DC/DC Converter," Crane Aerospace & Electronics Power Solutions, 2010, 17 pages.

"Step-gap "E" core swing chokes: Improved regulation and higher efficiency are possible when operating at minimum current levels," Technical Bulletin: Bulletin FC-S4, Magnetics Division, Spang & Company, Butler, Pennsylvania, 2001, 4 pages.

"Synchronous Rectification Aids Low-Voltage Power Supplies," Maxim Integrated Products, URL= http://www.maxim-ic.com/appnotes/index.mvp/id/652, download date Jun. 22, 2011, 6 pages.

Hughes, "Oscillator Apparatus and Method With Wide Adjustable Frequency Range," U.S. Appl. No. 13/185,152, filed Jul. 18, 2011, 37 pages.

Hume et al., "Power Converter Apparatus and Method With Compensation for Light Load Conditions," U.S. Appl. No. 13/185,142, filed Jul. 18, 2011, 31 pages.

Waltman et al., "Input Control Apparatus and Method With Inrush Current, Under and Over Voltage Handling," U.S. Appl. No. 13/185,210, filed Jul. 18, 2011, 41 pages.

Waltman et al., "Power Converter Apparatus and Method With Compensation for Current Limit/Current Share Operation," U.S. Appl. No. 13/185,172, filed Jul. 18, 2011, 45 pages.

Waltman et al., "Power Converter Apparatus and Methods," U.S. Appl. No. 61/508,937, filed Jul. 18, 2011, 139 pages.

Office Action, dated Dec. 17, 2013, for Corresponding U.S. Appl. No. 13/185,172, 15 pages.

* cited by examiner

SELF SYNCHRONIZING POWER CONVERTER APPARATUS AND METHOD SUITABLE FOR AUXILIARY BIAS FOR DYNAMIC LOAD APPLICATIONS

BACKGROUND

1. Technical Field

This disclosure is generally related to auxiliary power or bias voltage supplies, to efficiently provide supply or bias voltages from low input voltages. Such apparatus may, for example be useful in a wide variety of devices or systems, particularly those employing circuits with periodic high peak current power demands, for example, gate drive circuits employed in regulated switched mode power converters.

2. Description of the Related Art

Power converters are used to transform electrical energy, for example converting between alternating current (AC) and direct current (DC), adjusting (e.g., stepping up, stepping down) voltage levels and/or frequency.

Power converters take a large variety of forms. One of the most common forms is the switched-mode power converter or supply. Switched-mode power converters employ a switching regulator to efficiently convert voltage or current characteristics of electrical power. Switched-mode power converters typically employ storage components (e.g., inductor, transformer, capacitor) and switches that quickly switches between full ON and full OFF states, minimizing power losses. Voltage regulation may be achieved by varying the translated power by modulating the ratio of ON to OFF time or duty cycle. Various topologies for switched-mode power converters are well known in the art including non-isolated and isolated topologies, for example boost converters, buck converters, synchronous buck converters, buck-boost converters, and fly-back converters, and others.

In the interest of efficiency, digital logic technology is employing ever lower voltage logic levels. This requires power converters to deliver the lower voltages at higher current levels. To meet this requirement, power converters are employing more energy efficient designs. Power converters are also increasingly being located in close proximity to the load in as point of load (POL) converters in a POL scheme. These power converters must generate very low voltage levels (e.g., less than 1V) at increasingly higher current levels (e.g., greater than 10 A). These relatively high current levels may be difficult to achieve with a single power converter.

Manufacturers are also increasingly employing POL schemes in light of the widely varying voltage requirements in modern systems (e.g., computer systems). A POL scheme may be easier to design and/or fabricate, take up less area, and/or produce less interference than employing multiple different power buses. The POL schemes typically employ one or two power buses with a number of POL regulators located close to specific components or subsystems to be powered, for example microprocessors, field programmable gate arrays (FPGAs), application specific integrated circuits (ASICs), volatile memory. The POL regulators adjust voltage to supply localized busses feeding the specific components or subsystems.

Many devices employ an auxiliary power or bias voltage power supply to provide supply voltages VCC, VSS. For example, switched mode power converters typically include an auxiliary power or bias voltage supply.

Existing approaches to auxiliary power or bias voltage supplies include those that generate unregulated voltages. Other existing approaches employ linear regulators or inefficient circuitry to provide regulated bias voltages. Existing approaches that generate unregulated bias supply voltages are generally not suitable for very low input voltage applications since the bias voltage that is generated is not high enough for most electronic circuitry. Existing approaches that employ a linear regulator to generate a regulated bias voltage suffer from relatively high inefficiency due to the dissipation of energy through the regulating element (e.g., series pass element). Additionally, a linear regulator is typically not able to supply multiple output bias voltages. Hence, multiple linear regulators are needed for applications that required multiple output bias voltages, adding substantial cost. These existing approaches also tend to have a somewhat limited operational temperature range.

For very or ultra low voltage inputs, an auxiliary power or bias voltage supply must generate a regulated voltage that is higher than the input voltage. It is also desirable that the auxiliary power or bias voltage supply operate efficiently throughout its voltage range, and be tolerant of dynamic load transients. It is also desirable that the auxiliary power or bias voltage supply operating frequency be compatible with the main supply. Further, an auxiliary power or bias voltage supply should also operate over a wide temperature range.

New approaches to auxiliary power or bias voltage supplies and the generation of bias supply voltages are desirable.

BRIEF SUMMARY

Described herein are approaches to generating regulated bias supply voltages useful in powering internal circuitry of a device that operates to a very low input voltage with a wide temperature range. The described approaches employ a step up switch mode DC/DC power converter to very efficiently step up a low input voltage to generate or supply a regulated bias supply voltage. The step up switch mode DC/DC power converter may advantageously provide multiple regulated output voltages, which may be of both "+" and "−" polarities. The step up switch mode DC/DC power converter provides such low input voltage (e.g., less than 2V), and operates over a wide range of input voltage. The step up switch mode DC/DC power converter may advantageously operate over a wide temperature range. Use of the step up switch mode DC/DC converter topology advantageously allows parts count to be kept low, and allows a compact volume to be achieved. The approaches described here allow the auxiliary power supply or bias voltage supply to synchronize to a dynamic load, while also reducing switching interaction with the main converter over at least some existing approaches.

While described herein in terms of a regulated bias supply for use in power converters, the approaches described herein may be utilized in any device that is required to operate in similar situations. The regulated bias supply described herein could be sold as a standalone device.

A bias voltage supply to supply multiple regulated bias supply potentials to dynamic loads may be summarized as including a DC/DC converter including a transformer having at least two windings and a core, a first winding coupled at a first node to receive an input at a first input potential and coupled at a second node to provide a first output potential and a second output potential with an output voltage which is higher than an input voltage supplied to the DC/DC converter, the DC/DC converter also including a converter switch operable to selectively couple the second node of the first winding to a ground reference node; an error circuit coupled to control the converter switch through a second winding of the transformer based at least in part on a difference between the first output potential and a reference potential; and a synchronization capacitance electrically coupled in parallel with the diode between the first winding and the VCC output node that in response to a dynamic load condition provides a signal that is reflected by the first winding across the transformer to the second winding to drive the converter switch to synchronize operation with a periodic load demand.

The synchronization capacitance may be supplied at least in part by a parasitic capacitance of an output diode electrically coupled between the second node of the first winding and a VCC output node and at least in part by a substrate capacitive coupling. The error circuit may sum the first output potential and the reference potential and produce a voltage related to the time average of a difference between the first output potential and the reference potential. The error circuit may include an error amplifier that sums the first output potential and the reference potential, and may further include an integration capacitor that feeds back an output of the error amplifier to an input of the error amplifier. The error circuit may include a voltage to current circuit coupled to reflect an output of the error amplifier to the drive capacitor and second winding of the transformer. The error circuit may include a bipolar voltage-to-current converter, a control capacitance, a unipolar voltage-to-current converter a drive capacitance, and a drive resistor, the bipolar voltage-to-current converter coupled to receive the sum of the first output potential and the reference potential and to charge the control capacitance, the unipolar voltage-to-current converter coupled to be driven by a potential of the control capacitance and to charge the drive capacitance, the drive capacitance coupled to drive the second winding of the transformer through the drive resistor. The unipolar voltage-to-current converter may include a transistor, a base diode and an emitter resistor, the transistor having a base coupled to a ground reference node via the base diode, an emitter coupled to the control capacitance via the emitter resistor, and a collector coupled to the drive capacitance.

The bias voltage supply may further include a charge pump coupled to the second node of the first winding of the transformer to supply the second output potential. The first output potential may be supplied at a VCC output node and the charge pump may include a charge pump capacitor, a VSS output capacitor and a pair of charge pump diodes, a first one of the charge pump diodes coupled between the charge pump capacitor and a ground node and a second one of the charge pump diodes electrically coupled between the charge pump capacitor and a VSS potential output node, the VSS output capacitor electrically coupled between a first node between the first charge pump diode and the ground and a second node between the second charge pump diode and the VSS potential output node.

The bias voltage supply may further include an over voltage clamp circuit coupled to turn OFF the converter switch in response to a transient condition in at least one of the first input potential or the first output potential.

The bias voltage supply may further employ additional transformer windings and their corresponding rectifier diode and storage capacitor to create additional output potentials to provide bias power to additional circuits. An auxiliary voltage supply to supply a VCC supply potential and a VSS supply potential to dynamic loads may be summarized as including a transformer having at least a first winding, a second winding and a core; a converter switch operable to selectively couple the first winding to a ground reference node; a drive capacitance coupled to drive the converter switch; and a synchronization capacitance, wherein the transformer, the converter switch and the drive capacitance are coupled in a positive feedback loop such that as a current flow through the first winding via the converter switch increases, the first winding reflects a corresponding voltage change to the second winding that increases a drive voltage to turn the converter switch full ON and as current flow through the first winding via the switch decreases, the first winding reflects a corresponding voltage change to the second winding that decreases the drive voltage to turn the converter switch full OFF; and wherein the transformer, the converter switch and the synchronization capacitance are coupled such that in response to a dynamic load current demand larger than a threshold the first winding reflects a voltage pulse to the second winding to turn the converter switch ON to synchronize a cycle of the bias voltage supply.

The synchronization capacitance may be supplied at least in part by a parasitic capacitance of an output diode electrically coupled between the first winding and a VCC output node. The synchronization capacitance may be supplied at least in part by a parasitic substrate capacitive coupling, or an added capacitor.

The auxiliary voltage supply may further include an error circuit coupled to control the converter switch through the second winding of the transformer based at least in part on a difference between an output voltage and a reference voltage. The error circuit may produce a signal representing a time averaged difference of the sum of the VCC supply potential and a reference potential.

A method of operating an auxiliary voltage supply to supply a VCC supply potential and a VSS supply potential to dynamic loads, the auxiliary voltage supply comprising a transformer having at least a first winding, a second winding and a core; a converter switch operable to selectively couple the first winding to a ground reference node; a drive capacitance coupled to drive the converter switch; and a synchronization capacitance may be summarized as including increasing a supply of current via the converter switch to the first winding of the transformer; in response to an increase in current flow through the first winding via the converter switch, reflecting a corresponding voltage change by the first winding to the second winding; increasing a drive voltage to turn the converter switch full ON in response to the reflection of the voltage change corresponding to the increase in current flow through the first winding; decreasing the supply of current via the converter switch to the first winding of the transformer; in response to the decrease in current flow through the first winding via the converter switch, reflecting a corresponding voltage change by the first winding to the second winding; decreasing a drive voltage to turn the converter switch OFF in response to the reflection of the voltage change corresponding to the decrease in current flow through the first winding; in response to a dynamic load current demand larger than a threshold, providing a voltage pulse to the first winding by the synchronization capacitance; reflecting the voltage pulse on the first winding to the second winding; and applying the voltage pulse via the second winding to turn the converter switch ON to synchronize a cycle of the bias voltage supply.

The method may further include determining a difference between an output voltage and a reference voltage; and applying a signal to the second winding based on the determined difference.

The method may further include determining a time averaged difference of a sum of the VCC supply potential and a reference potential; and applying a signal to the second winding based on the determined time averaged difference.

The method may further include driving a charge pump coupled to the first winding of the transformer to supply the VSS supply potential.

BRIEF DESCRIPTION OF THE SEVERAL
VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with power conversion topologies have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

As used in the specification and the appended claims, references are made to a "node" or "nodes." It is understood that a node may be a pad, a pin, a junction, a connector, a wire, or any other point recognizable by one of ordinary skill in the art as being suitable for making an electrical connection within an integrated circuit, on a circuit board, in a chassis or the like.

The headings and Abstract of the Disclosure provided herein are for convenience only and do not interpret the scope or meaning of the embodiments.

Figure 1:
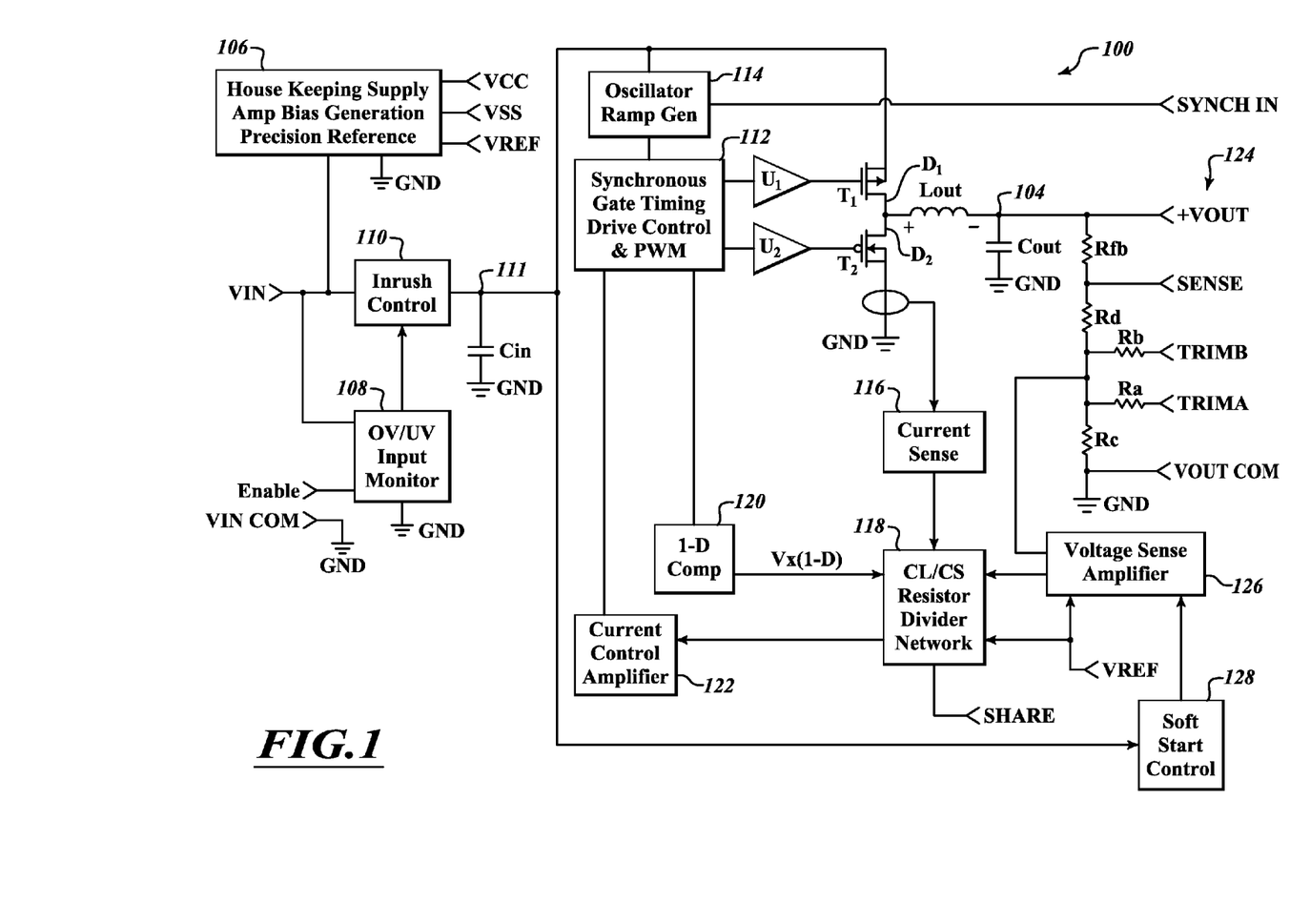
FIG. 1 is a schematic diagram of a power converter including an input control circuit with an inrush current control block, an over voltage/under voltage monitor block, and responsive to an enable signal, according to one illustrated embodiment.

FIG. 1 shows a power converter 100, according to one illustrated embodiment. The description of FIG. 1 provides an overview of the structure and operation of the power converter 100, which structure and operation are described in further detail with reference to FIGS. 2-7.

The power converter 100 may, for example, take the form of a DC/DC power converter to convert (e.g., raise, lower) DC voltages. The power converter 100 may, for example, include an output inductor $L_{out}$ electrically coupled to an output terminal +VOUT, a first active switch (i.e., high side active switch) $T_1$ selectively operable to electrically couple the inductor Lout to a voltage input terminal VIN. A second device $T_2$ electrically couples the output inductor Lout to a ground GND which is in turn electrically coupled to a ground or common input terminal VIN COM and a ground or common output terminal VOUT COM.

As illustrated, the power converter 100 may advantageously take the form of a synchronous buck converter, operable to lower a DC voltage. Where implemented as a synchronous buck converter, the second device $T_2$ takes the form of a second active switch (i.e., high side active switch), selectively operable to electrically couple the output inductor Lout to ground GND. The power converter 100 may take forms other than a synchronous buck converter, for example a buck converter where the second device takes the form of a passive device, such as a diode (not shown).

The switches $T_1$, $T_2$ may take a variety of forms suitable for handling expected currents, voltages and/or power. For example, the switches $T_1$, $T_2$ make take the form of an active device, such as one or more metal oxide semiconductor field effect transistors (MOSFETs). As illustrated in the Figures, the first or high side switch $T_1$ may take the form of P-Channel MOSFET, while the second or low side switch $T_2$ make take the form of an N-Channel MOSFET. The output inductor $L_{out}$ may be coupled via a node 102 to the drains $D_1$, $D_2$ of the MOSFET switches $T_1$, $T_2$ respectively. The power converter 100 may employ other types of switches, for example insulated gate bipolar transistors (IGBTs). While only one respective MOSFET is illustrated, each of the first and/or second switches $T_1$, $T_2$ may include two or more transistors electrically coupled in parallel.

The power converter 100 may include an output capacitor Cout electrically coupled between ground GND and a node 104 between the output inductor Lout and the output terminal +VOUT. Output capacitor Cout may smooth the output supplied to the output terminal +VOUT.

On an input side, the power converter 100 may include an auxiliary power supply and voltage reference generation block 106, an over voltage/under voltage monitor block 108 and/or an "in rush" current control block 110.

The auxiliary power supply and voltage reference generation block 106 implements a house keeping supply generation function, amplifier bias generation function and precision reference generation function, resulting in a positive supply voltage VCC, a negative supply voltage or ground VSS, and a precision reference voltage VREF.

The over voltage/under voltage monitor block 108 monitors instances of over voltage and/or under voltage conditions, supplying a control signal via a control line (not called out in FIG. 1) to the "in rush" current control block 110 as needed. The over voltage/under voltage monitor block 108 or other components may be triggered via an enable signal via an enable input terminal ENABLE. The "inrush" current control block 110 controls "inrush" current, directly limiting current to input capacitor(s) Cin, reducing electrical stresses on the power converter 100 and any system into which the power converter 100 is incorporated. Power converters 100 typically employ large internal bulk filter capacitors to filter the input power to reduce noise conducted out of the power converter 100, back upstream to the source of the input power. The input capacitor $C_{in}$ is electrically coupled between ground GND and a node 111 between the "inrush" current control block 110 and the first active switch $T_1$. The "inrush" current control block 110 is configured to control the "inrush" current that flows to the input capacitor, particularly at initial application of the input voltage VIN.

The structure and operation of the over voltage/under voltage monitor block 108, the "inrush" current control block 110, and the input capacitor(s) Cin may take any existing form, and are not subjects of this application so are not described in further detail.

Figure 2:
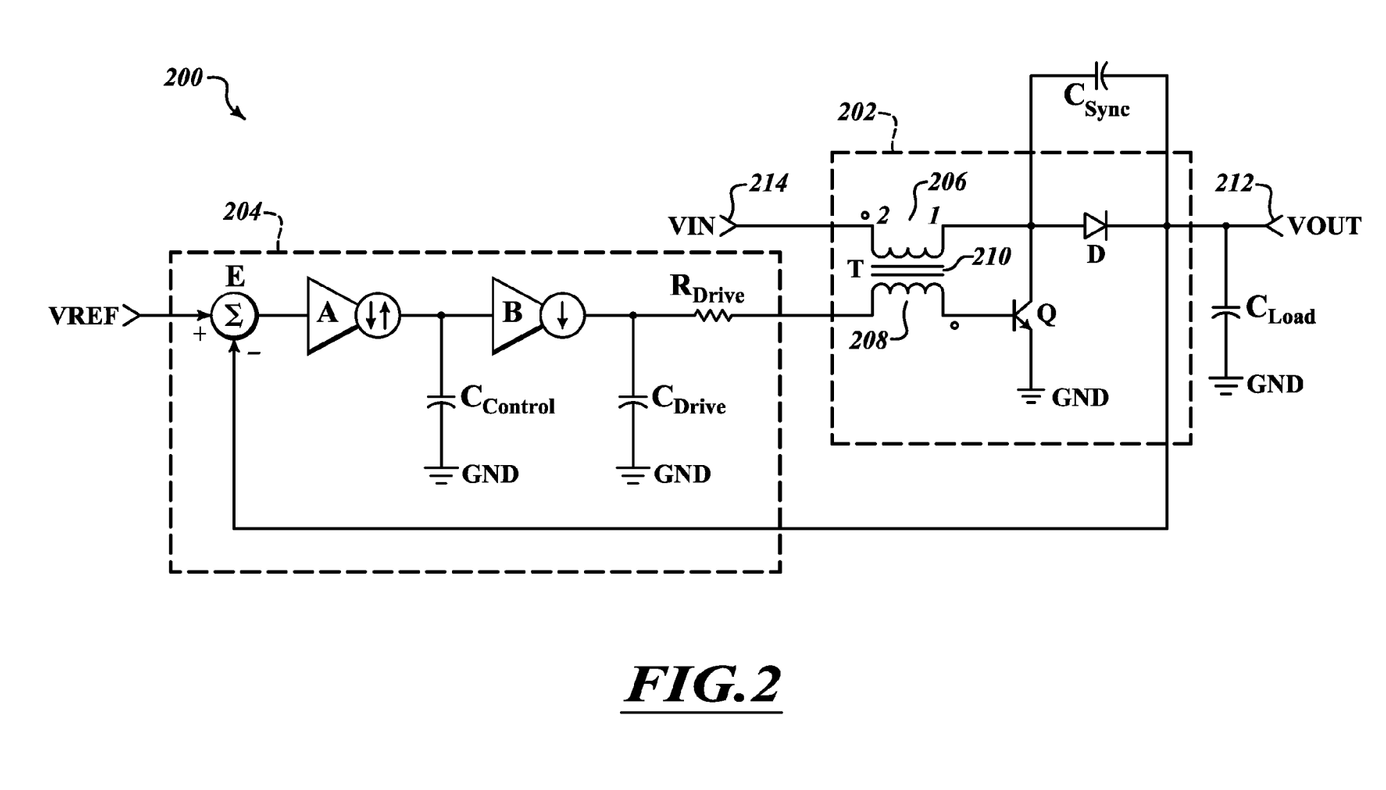
FIG. 2 is a functional block diagram of the auxiliary power supply or very or ultra low input voltage bias voltage supply of FIG. 1, according to one illustrated embodiment.

Control of the converter circuit (e.g., synchronous buck converter) is realized via a number of components or assemblies, represented in FIGS. 1 and 2 as blocks.

The power converter 100 includes a synchronous gate timing drive control and pulse width modulation (PWM) block 112. The synchronous gate timing drive control and pulse width modulation block 112 generates gate control signals to control the switches $T_1$, $T_2$, for example via amplifiers $U_1$, $U_2$, respectively. The synchronous gate timing drive control and pulse width modulation block 112 may optionally receive a share signal via a share input terminal SHARE from one or more other power converters, for example when electrically coupled to a common load for current sharing operation. The structure and operation of the a synchronous gate timing drive control and pulse width modulation (PWM) block 112 can take any existing form, and is not a subject of this application, so is not described in further detail.

The power converter 100 includes an oscillator ramp generation block 114, also interchangeably referred to herein and in the claims as oscillator or oscillator circuit 114. The oscillator ramp generation block 114 generates an oscillating ramp signal and provides the oscillating ramp signal to the synchronous gate timing drive control and pulse width modulation block 112. Advantageously, the oscillator ramp generation block 114 may be selectively synchronized to an external source over a wide frequency range. The oscillator ramp generation block 114 may receive a synchronization signal via a synchronization input terminal SYNC IN, to synchronize operation with one or more other power converters or other devices or systems, for example a clock of a system in which power converter 100 is installed. Such synchronization may advantageously reduce overall system noise. The oscillator ramp generation block 114 may advantageously take a form that provides for external slope modulation of the ramp signal, a wider temperature range and/or an ultra wide synchronous frequency range as compared to existing oscillator ramp generation circuits. The oscillator ramp generation block 114 may additionally, or alternatively, take a form that advantageously employs less complex types of components and/or is less expensive to produce as compared to existing oscillator ramp generation circuits. The structure and operation of exemplary embodiments of the oscillator ramp generation block 114 are described in detail herein with reference to FIGS. 2-7.

At a high level, the power converter 100 utilizes an inner current control loop and an outer voltage control loop. The inner current control loop is implemented via a current sense block 116, a current limiting/current sharing (CL/CS) resistor network 118, a 1–D (one minus duty cycle) compensation block 120 and a current control amplifier 122. The outer voltage control loop is implemented by a voltage sense resistor divider network 124 (e.g., resistor Rfb coupled between voltage output terminal +VOUT and sense terminal SENSE, divider resistors Rd, Rc, and trim resistors Rb, Ra coupled to trim terminals TRIMB, TRIMA, respectively) and a voltage error amplifier 126 which feeds the CL/CS resistor network 118 to ultimately control the output voltage of the power converter 100.

With respect to the inner current control loop, the current sense block 116 implements current sensing over a portion of a cycle of the power converter 100, for example over the ON or CLOSED portion of one of the switches $T_1$, $T_2$. The current sense block 116 provides a signal to the CL/CS resistor divider network 118 to control the current control amplifier 122, which signal is indicative of the sensed current. For example, the current sense block 116 may sense current over each portion of a cycle during which portion the low side switch T2 is ON or CLOSED (i.e., conducting), electrically coupling the output inductor $L_{out}$ to ground GND, while neglecting those portions of the cycle when the low side switch T2 is OFF or OPEN.

Where the output current of the synchronous buck converter circuit in the power converter 100 is sensed at the low side switch (e.g., MOSFET synchronous switch) $T_2$, the average of this sensed current is equal to lo*(1–D), where D is defined as the duty cycle of the high side switch (e.g., MOSFET) $T_1$. Since this signal is dependent on the duty cycle and negative in value, a compensation signal that is a direct function of the duty cycle is scaled via the 1–D compensation block 120, and summed with the sensed current signal by the CL/CS resistor network 118. The resultant signal is optionally level shifted in the CL/CS resistor network 118 to create a level shifted compensated signal. The level shifted compensated signal may then be averaged by the current control amplifier 122, and the averaged signal used to control the output current of the power converter 100.

The current control amplifier 122 generates control signals based at least on the level shifted compensated signals from the CL/CS resistor divider network 117 to control the synchronous gate timing drive control and pulse width modulation block 112.

With respect to the inner current control loop, the voltage sense resistor network 124 (e.g., resistor Rfb coupled between voltage output terminal +VOUT and sense terminal SENSE, divider resistors Rd, Rc, and trim resistors Rb, Ra coupled to trim terminals TRIMB, TRIMA, respectively) senses voltage or potential at the output terminal +VOUT with respect to the ground terminal VOUTCOM. The voltage sense resistor network 124 supplies a signal indicative of the sensed voltage or potential to the voltage sense amplifier 126. The voltage sense amplifier 126 generates a voltage error signal which indicates a difference between the sensed voltage or potential and a reference voltage or potential. Hence, the voltage sense amplifier 126 is interchangeably referred to herein and in the claims as voltage error amplifier 126. The voltage error amplifier 126 provides the voltage error signal to the current control amplifier 122 via the CL/CS resistor divider network 118, for use in generating the control signals supplied to the synchronous gate timing drive control and pulse width modulation block 112 to control output voltage or potential of the power converter 100.

The power converter 100 may optionally include a soft start control block 128. The soft start control block 128 may receive the precision voltage reference signal VREF from the auxiliary power supply and voltage reference generation block 106. The soft start control block 128 may control various soft start characteristics of the power converter 100, for example soft-start time, current limit thresholds, current limit on-time and output voltage or potential level at which control is handed over to a main control loop. The soft start control block 128 may, for example, provide a progressively increasing pulse width, forming a startup voltage ramp which is proportional to a level of a supply voltage VCC, for instance without the need of an external capacitor. The structure and operation of the soft start control block 128 can take any existing form, and is not a subject of this application so is not described in further detail.

The topology illustrated in and described with reference to FIG. 1 is illustrative of only one of the many possible converter topologies which may employ the oscillator ramp generation block 114 described herein. For example, the oscillator ramp generation block 114 may be employed in power converters which use a different converter circuit topology, for instance boost converter, buck converter or fly-back converter topologies. Also for example, the oscillator ramp generation block 114 may be employed in power converters which use a different control topology, for instance a control topology that senses output current over an entire cycle of the waveform without the need for compensation, or which senses current at the high side active switch. Thus, this application, and in particular the claims, should not be limited to the specific topology illustrated in and discussed with reference to FIG. 1 unless expressly stated therein.

FIG. 2 shows an auxiliary power supply or very or ultra low input voltage bias voltage supply 200, according to one illustrated embodiment. The auxiliary power supply or voltage bias voltage supply 200 may implement the auxiliary power supply and voltage reference generation block 106 (FIG. 1) to supply, produce or generate regulated bias supply voltages or potentials VCC, VSS suitable for powering circuitry of a device at very or ultra low input voltages.

The auxiliary power supply or bias voltage supply 200 includes a boost converter circuit 202, synchronization capacitor or capacitance $C_{Sync}$ and a feedback circuit 204 coupled to control the boost converter circuit 202 based on a difference between an output voltage VOUT and a reference voltage VIN, the auxiliary power supply or bias voltage supply 200 capable of automatically synchronizing to a dynamic load. Primarily the gate drive buffer amplifies V1+V2 of FIG. 1.

The boost converter circuit 202 includes a transformer T, which has a first winding 206 and a second winding 208 and a core 210 on which windings forming the first winding 206 and second winding 208 may be wrapped. The first winding 206 acts as an inductor in the boost converter topology, with a first pole (pin 1) coupled to an output pin, terminal or node 212 and a second pole (pin 2) coupled to the input pin, terminal or node 214. The boost converter circuit 202 also includes a converter primary switch Q (e.g., transistor) operable in response to control signals from the feedback control circuit 204 to selectively couple the first pole (pin 1) of the first winding 206 to a ground reference or potential GND. The boost converter circuit 202 includes an output diode D serially coupled between the first pin of the transformer T and the output pin, terminal or node 212. The synchronizing capacitor or capacitance $C_{Sync}$ may be electrically coupled in parallel with the output diode D between a collector of the converter primary switch Q and the output pin, terminal or node 212. An output capacitor COUT may couple the output pin, terminal or node 212 to a ground reference or potential GND.

The feedback circuit includes a summing device E, bipolar voltage-to-current converter A, control capacitor $C_{Control}$, unipolar voltage-to-current converter B, drive capacitor $C_{Drive}$ and drive resistor $R_{Drive}$. The voltage-to-current converter A, and unipolar voltage-to-current converter B are each coupled to a ground reference or potential GND.

In operation, a difference between a reference voltage VREF and the output voltage VOUT is applied to the bipolar voltage-to-current converter A. This current is collected in a capacitor to create a time averaged control voltage or potential on the terminals of the control capacitor $C_{Control}$, representing the required drive energy to maintain a desired output voltage VOUT. This control voltage is applied to the unipolar voltage-to-current converter B. The resulting current is collected and stored in the drive capacitor $C_{Drive}$. The voltage on the drive capacitor $C_{Drive}$ begins to rise, and is transferred to a base of the converter primary switch Q via a drive resistor $R_{Drive}$ and the second winding 208 of the transformer T. When the voltage on the base of the converter primary switch Q reaches the required base-to-emitter voltage ($V_{be}$) threshold, base current will flow causing a greater amount of collector current to flow.

This collector current in converter primary switch Q flows through the first winding 206 of transformer T and begins to develop a voltage across the first winding 206. This voltage is reflected to the second winding 208 causing an additional base voltage drive to the base of converter primary switch Q. The converter primary switch Q in turn develops an even greater collector current, and this positive feedback loop forces the converter primary switch Q to turn ON fully with the collector-to-emitter voltage equal to saturation voltage (i.e., $V_{ce}=V_{sat}$).

In response, the current in the first winding 206 of transformer T begins to ramp at this instant. The voltage developed across the second winding 208 of the transformer T continues to move charge stored in the drive capacitor $C_{Drive}$ into the base of the converter primary switch Q. This continues as the current of the transformer T ramps, until the drive capacitor or capacitance $C_{Drive}$ is sufficiently depleted and can no longer supply enough energy to sustain the required base current to meet the requirements of increasing demand of the ramping T current in the collector of the converter primary switch Q.

At this point, the voltage across the first winding 206 of transformer T begins to decrease, and this voltage change is reflected in the second winding 208 causing a reduction in base drive current to the base of the converter first winding switch Q. This action further reinforces the turn OFF of the converter first winding switch Q and thereby interrupts the current path through the first winding 206 of the transformer T to the ground reference or potential GND.

In response, the transformer output voltage will rise above the input voltage VIN until the transformer T can release stored magnetic energy as current through output diode D into the load capacitor $C_{Load}$. After the total stored magnetic energy is transferred to the load, the voltage across the transformer windings return to zero. During this drive cycle the voltage across the drive capacitor or capacitance $C_{Drive}$ will have been driven negative. The voltage to the unipolar voltage-to-current converter B continues to supply DC current to the drive capacitor or capacitance $C_{Drive}$ until the base current of the converter primary switch Q again begins to flow and the cycle repeats.

As the drive capacitor or capacitance $C_{Drive}$ is charging, if a large dynamic load current demand causes the output voltage VOUT to abruptly decrease, the synchronization capacitor or capacitance $C_{Sync}$ will cause a small pulse voltage to be developed across the first winding 206 of transformer T. This voltage pulse will be reflected into the second winding 208 to drive the base of converter primary switch Q positive. Thus, this initiates a cycle synchronized to a periodic load demand with proper selection of the load capacitance $C_{Load}$ to allow some output voltage ripple.

Figure 3:
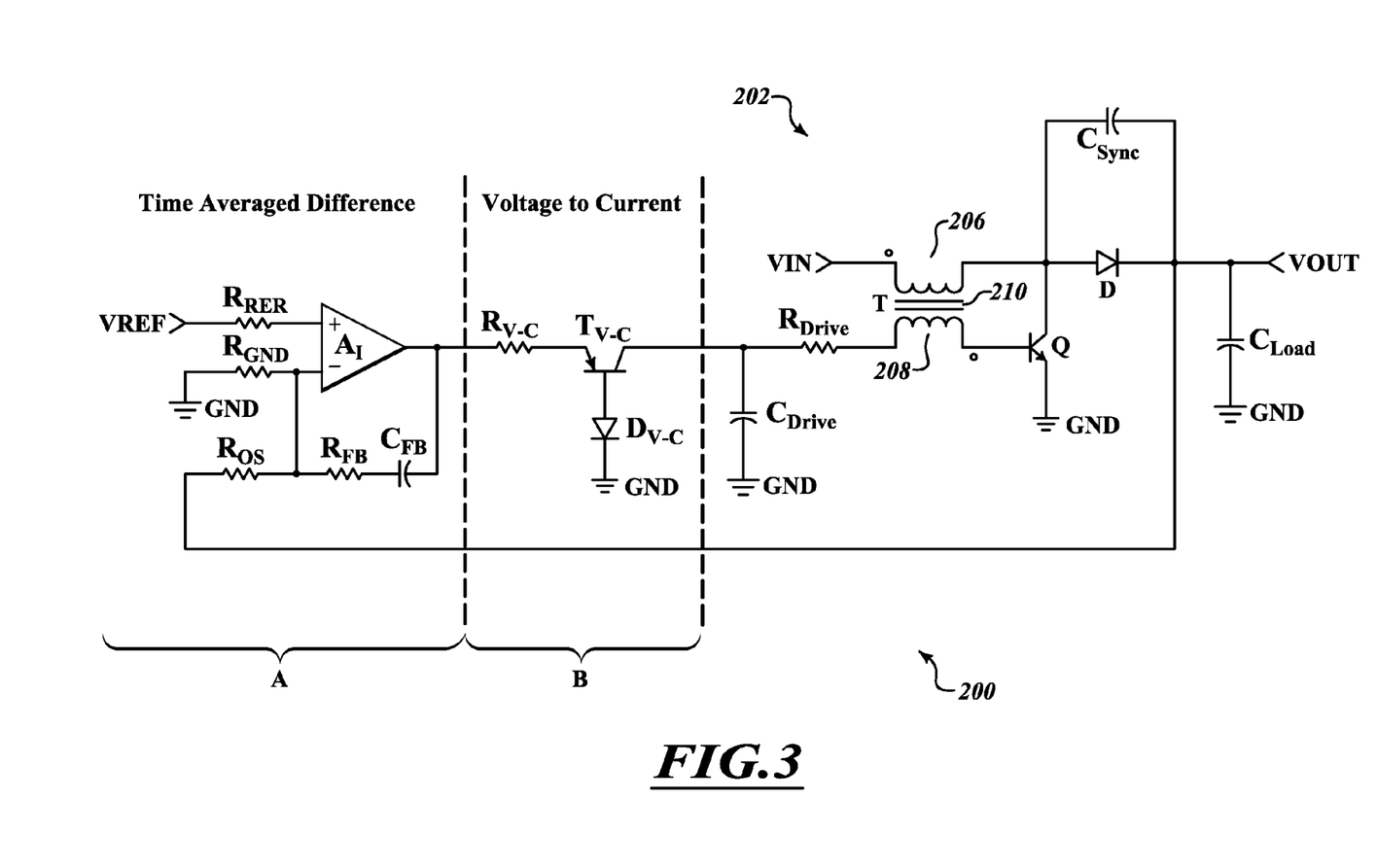
FIG. 3 is a detailed electrical schematic diagram of the auxiliary power supply or very or ultra low input voltage bias voltage supply of FIGS. 1 and 2, according to one illustrated embodiment.

FIG. 3 shows the auxiliary power supply or very or ultra low input voltage bias voltage supply 200 of FIG. 2 with the feedback circuit 204 represented in more detail. Many of the components and configuration illustrated in Figure to are similar or even identical to those of FIG. 2. Hence, similar or identical components between these Figures will share common reference numbers, and in the interest of brevity only some of the significant differences will be discussed below.

The feedback circuit 204 may be implemented using an integration amplifier $A_I$ to determine a time averaged difference between an output voltage VOUT and a reference voltage VREF. A positive pin or input of the integration amplifier $A_I$ is coupled to the reference voltage VREF via a reference resistor $R_{REF}$. A negative pin or input of the integration amplifier $A_I$ is coupled to the output voltage VOUT via an output signal resistor $R_{OS}$, and is also coupled to ground via a ground resistor $R_{GND}$. An output of the integration amplifier $A_I$ is coupled to the unipolar voltage-to-current converter B. The output of the integration amplifier $A_I$ is also fed back to the negative pin or input of the integration amplifier $A_I$ via a feedback capacitor $C_{FB}$ and feedback resistor $R_{FB}$.

The unipolar voltage-to-current converter B is implement by a voltage-to-current resistor $R_{V-C}$, voltage-to-current transistor $T_{V-C}$ and voltage-to-current diode $D_{V-C}$. The voltage-to-current resistor $R_{V-C}$ supplies a current to an emitter of the voltage-to-current transistor $T_{V-C}$ generated by the voltage or potential of the output of integration amplifier $A_I$. A base of the voltage-to-current transistor $T_{V-C}$ is coupled to a ground reference or potential via the voltage-to-current diode $D_{V-C}$. A collector of the voltage-to-current transistor $T_{V-C}$ is coupled to the second winding 208 of the transformer T via the drive capacitor or capacitance $C_{Drive}$ and the drive resistor $R_{Drive}$.

Thus, the circuit of FIGS. 2 and 3 provide and simple elegant solution for generating supply bias voltage at higher levels than an input voltage, while implementing inherent synchronization with a dynamic load.

Figure 4:
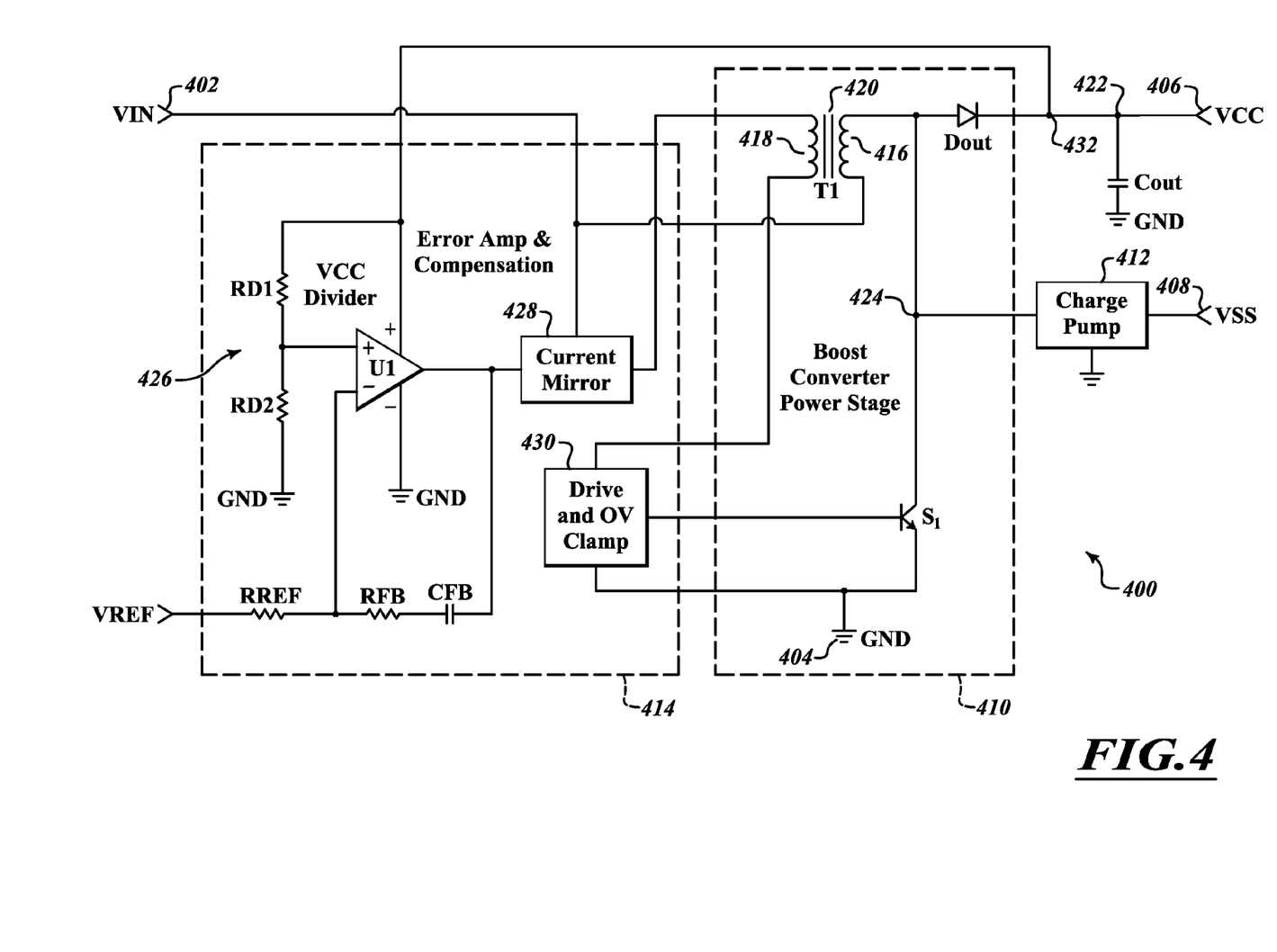
FIG. 4 is a functional block diagram of the auxiliary power supply or very or ultra low input voltage bias voltage supply of FIG. 1, according to one illustrated embodiment.

FIG. 4 shows an auxiliary power supply or very or ultra low input voltage regulated bias voltage supply 400, according to one illustrated embodiment. The auxiliary power supply or voltage bias voltage supply 400 may implement the auxiliary power supply and voltage reference generation block 106 (FIG. 1) to supply, produce or generate regulated bias supply voltages or potentials VCC, VSS suitable for powering circuitry of a device at very or ultra low input voltages.

The auxiliary power supply or regulated bias voltage supply 400 is coupled to an input pin, terminal or node 402 to receive in input voltage or potential VIN and to a ground pin, terminal or node 404 to receive a ground reference or potential GND. The auxiliary power supply or regulated bias voltage supply 400 has a first output pin, terminal or node 406 to supply the bias voltage or potential VCC and a second output pin, terminal or node 408 to supply the bias voltage or potential VSS.

The auxiliary power supply or regulated bias voltage supply 400 includes a boost converter 410, charge pump circuit 412, and feedback control circuit 414.

The boost converter 410 is configured to generate a main positive output voltage or potential VCC. The boost converter 410 includes a transformer T1, which has a first winding 416 and a second winding 418 and a core 420 on which windings forming the first winding 416 and second winding 418 may be wrapped. The first winding 416 acts as an inductor in the boost converter topology, with a first pole (pin 1) coupled to the output pin, terminal or node 406 and a second pole (pin 2) coupled to the input pin, terminal or node 402. The boost converter 410 also includes a switch S1 (e.g., transistor) operable in response to control signals from the feedback control circuit 414 to selectively couple the first pole (pin 1) of the first winding 416 to a ground reference GND. The boost converter 410 includes an output diode Dout serially coupled to the first output pin, terminal or node 406 to prevent current reversal. An output capacitor Cout may be coupled between a ground reference GND and a node VOUT/VCC between the output diode Dout and the first output pin, terminal or node 406 to provide output smoothing.

The charge pump circuit 412 is configured to supply the negative output voltage or potential at the second output pin, terminal or node 408, so may be denominated as the negative output voltage charge pump circuit. The charge pump circuit 412 is coupled between a ground reference or potential GND and a node 424 of the boost converter 410 on a path to the ground reference or potential GND through the switch S1.

The feedback control circuit 414 includes an error amplifier U1, supply voltage divider circuit 426, current mirror circuit 428 and drive/over voltage clamp circuit 430.

The supply voltage divider circuit 426 is formed of a pair of voltage divider resistors RD1, RD2, and coupled between an input line 432 that carries the input voltage or potential VIN and a ground reference or potential GND. The error amplifier U1 receives a signal on a positive or non-inverting pin from the supply voltage divider circuit 426 and receives a threshold signal VREF on a negative or inverting pin via a reference resistor RREF. The error amplifier U1 produces an output at an output pin, which is supplied to the voltage to current circuit 428. The output of the error amplifier U1 is also fed back to the negative or inverting pin of the error amplifier U1 via a feedback capacitor CFB and feedback resistor RFB. The error amplifier U1 receives supply voltages or potentials from a ground reference or potential GND and from the main positive supply bias voltage VCC of the boost converter 410, at a node 432 downstream or following the output diode Dout.

The voltage to current circuit (V to I) 428 is coupled to receive the output of the error amplifier U1. The voltage to current circuit 428 is also coupled to the input pin, terminal or node to receive the input voltage or potential VIN and the second pole (pin 2) of the first winding 416. The voltage to current circuit is coupled to create current to a first pole (pin 3) of the second winding 418 of the transformer T1.

The drive/over voltage clamp circuit 430 is coupled between the second pole (pin 4) of the second winding 418 of the transformer T1 and the ground reference or potential GND. The drive/over voltage clamp circuit 430 is coupled to provide control signals to control the switch $S_1$, for example by supplying control signals to a gate thereof.

Figure 5:
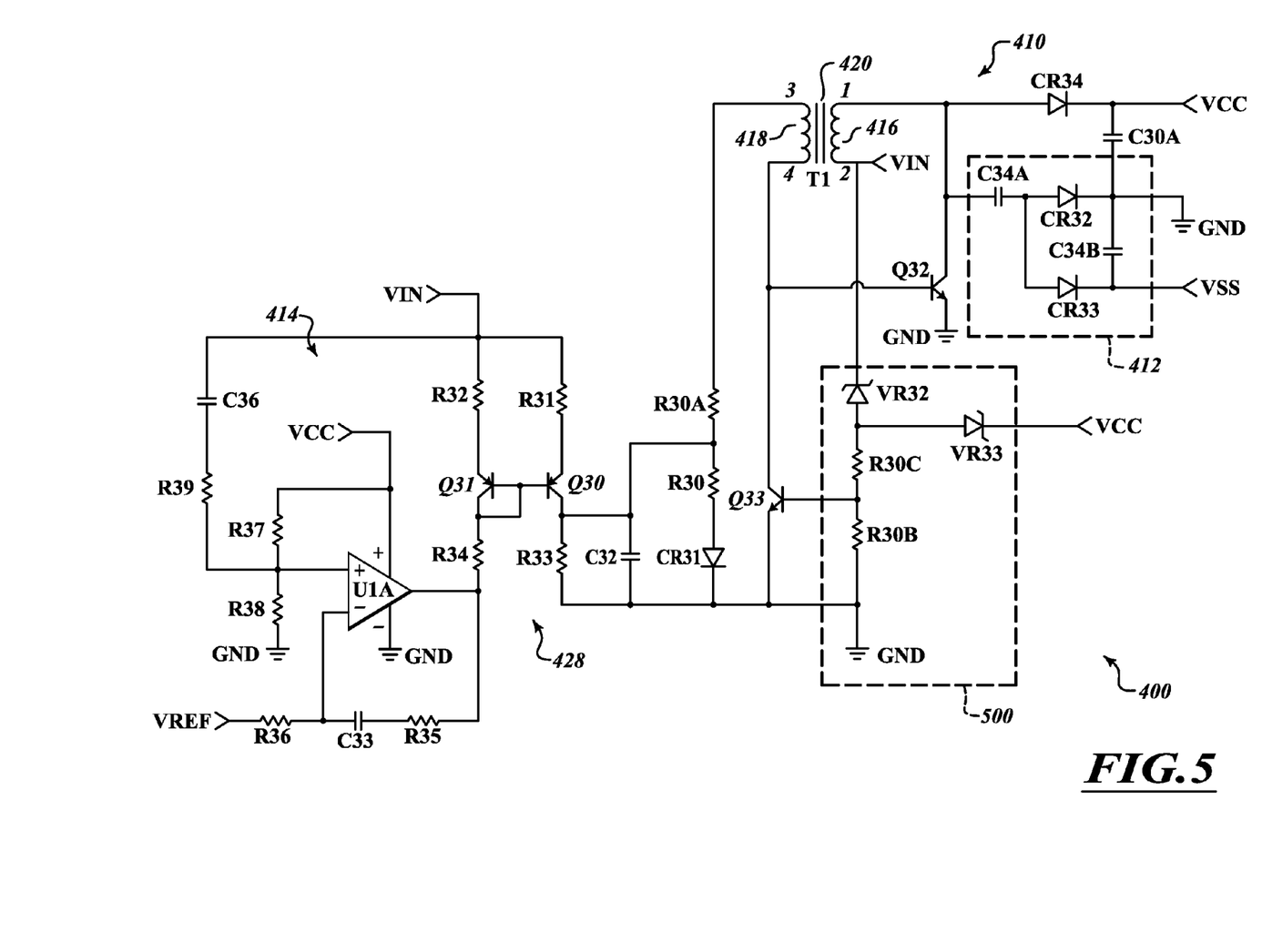
FIG. 5 is a detailed electrical schematic diagram of the auxiliary power supply or very or ultra low input voltage bias voltage supply of FIGS. 1 and 5, according to one illustrated embodiment.

FIG. 5 shows in more detail an implementation of the auxiliary power supply or very or ultra low input voltage regulated bias voltage supply 400 of FIG. 4, according to one illustrated embodiment. As illustrated, the auxiliary power supply or very or ultra low input voltage bias voltage supply 400 may employ less complex, and less costly discrete semiconductor components, chips resistors and capacitors, than employed by existing control circuitry.

Boost Converter Operation

The boost converter 410 (FIG. 1) includes the transformer T1, switch S1 (FIG. 1) in the form of a switching transistor Q32, VCC output diode CR34 and VCC output capacitor C30A. The boost converter 410 generates or supplies the main output voltage or potential VCC of the auxiliary power supply or voltage bias voltage supply 400.

The switching action of the boost converter 410 increases a positive output supply voltage or potential VCC to a level higher than the input voltage or potential VIN. The auxiliary power supply or bias voltage supply 400 can operate at a very low input voltage or potential VIN, typically 1.5 to 2V, i.e., a voltage sufficient to power an operational amplifier (i.e., error amplifier) UA1.

The transformer T1 functions as a coupled inductor, which can be modeled as an ideal transformer with a mutual inductance in parallel with the first winding 416, pin 1 to pin 2.

A switching cycle of the boost converter 410 starts, assuming there is sufficient voltage on a drive capacitor C32 via current from a first mirror transistor Q30 of a pair of mirror transistors Q30, Q31 to turn ON the switching transistor Q32. The switching cycle begins with turn ON of the switching transistor Q32, during which the current in the mutual inductance of T1 increases linearly.

The first winding 416 and second winding 418 of the transformer T1 are magnetically coupled, thus any voltage drop created across the first winding 416 will be reflected to the second winding 418. The first winding 416 and second winding 418 have a turns ratio. For a turns ratio of, for example 2:1, half of the voltage across the first winding 416 will be reflected to the second winding 418, from pin 3 to pin 4. The switching transistor Q32 is operable to selectively couple the first pole (pin 1) of the first winding 416 to a ground reference GND.

The second winding 418 transfers charge from the drive capacitor C32, thereby injecting current into a base of the switching transistor Q32 reinforcing the turn ON of the switching transistor Q32 (i.e., positive feedback). This drives the switching transistor Q32 hard into saturation and results in a negative voltage on drive capacitor C32. In response, charge current to the drive capacitor C32 decreases, and switching transistor Q32 turns OFF.

Once switching transistor Q32 turns OFF, the current in the mutual inductance of the transformer T1 continues to flow, decreasing linearly, through VCC output diode CR34, charging VCC output capacitor C30A and powering a load (not shown) coupled to receive the supply voltage or potential VCC. During the off time of the switching transistor Q32, the drive capacitor C32 charges again from the current source provide by the first voltage to current output Q30 to a level that again turns ON the switching transistor Q32 and the cycle repeats at a periodic rate. Stray capacitance across VCC output diode CR34 tends to cause the cycle to coincide with a dynamic load demand, forcing synchronization to occur. Thus, the parasitic capacitance across VCC output diode CR34, combined with substrate parasitic capacitance provides the synchronization capacitance $C_{Sync}$. In this case the VCC output diode CR34 may be implemented with a pair of diodes coupled in parallel with one another, thereby increasing this synchronization capacitance $C_{Sync}$.

The magnetizing current always falls to zero before the next switch cycle of the switching transistor Q32 and the boost converter 410 is always operating in the discontinuous current mode. For very light loads, the periodic switching can extend to very low rates.

Charge Pump

The charge pump may be formed by a charge pump capacitor C34A, VSS output capacitor C34B and charge pump diodes CR32, CR33.

When the switching transistor Q32 turns OFF, the voltage at the first pole (pin 1) of the first winding 416 of transformer T1 is equal to the positive bias or supply voltage or potential VCC plus the forward voltage drop Vd of the VCC output diode CR34 (VCC-Vd), charging the charge pump capacitor C34A through charge pump diode CR32 to approximately VCC. When the switching transistor Q32 turns ON for the next on cycle, charge is transferred from charge pump capacitor C34A through VSS output diode CR33 charging the VSS output capacitor C34B toward a negative value. Current loading on the VSS output capacitor C34B will discharge the capacitor between charge cycles and reduce the average negative voltage. The average negative voltage on the VSS output capacitor C34B can be adjusted by selection of the capacitance values of the charge pump capacitor C34A and the VSS output capacitor C34B. The maximum unloaded negative value will track the peak positive supply voltage $$VCC \text{ to a max of approximately } \left( VCC_{peak} - V_{cesat \atop Q32} - V_{diode \atop CR33} \right).$$

Bias Supply OVP

The bias supply may include an over voltage protection (OVP) circuit 500 to shut the bias down if the supply voltage or potential VCC gets too high, or if the input voltage VIN gets too high. This OVP circuit may be formed by a network including a pair of OVP Zener diodes VR32, VR33, a pair of OVP resistors R30C, R30B, and an OVP transistor Q33. If the supply voltage or potential VCC or input voltage or potential VIN get too high (e.g., transient), Zener diode VR32 or Zener diode VR33 will conduct, turning ON drive transistor Q33 which will short a base of the switching transistor Q32 maintaining the switching transistor Q32 in an OFF or non-conducting state.

Voltage Loop Feedback and Bias Control

The voltage feedback circuit 414 may include an integration operational amplifier U1A to integrate the difference between the input voltage VIN and the reference threshold VREF over time, and associated resistors/capacitors. VCC voltage or potential is supplied to the positive power pin of the integration operational amplifier U1A and a ground reference or potential GND is supplied to a negative power pin of the integration operational amplifier UA1, providing power to the operational amplifier U1A. The supply voltage or potential VCC is divided by a ratio of resistances of a pair of VCC divider resistors R38, R37, and coupled to the positive input pin of the integration operational amplifier U1A and compared to a threshold VREF supplied at the negative input pin of the integration operational amplifier U1A. A compensation network may be formed by compensation resistors R35, R36 and compensation capacitor C33, adjusted to provide an appropriate magnitude and phase frequency response in the voltage feedback control loop.

An output of the integration operational amplifier U1A controls the voltage to current circuit 428. The voltage to current circuit 428 may be formed by a resistor R34 and a pair of voltage to current transistors Q31, Q30. A base and a collector of the second transistor Q31 are commonly coupled, and a voltage drop across a second voltage to current resistor R32 is impressed across a first voltage to current resistor R31, assuming an emitter-to-base voltage of the second transistor Q31 is equal to an emitter-to-base voltage of the first transistor Q30. A current in a collector of the first transistor Q30 is then proportional to a current in a collector of the second transistor Q31, i.e., the current through operational amplifier output resistor R34 which is directly controlled by the output of the integration operational amplifier U1A. The collector the first transistor Q30 is coupled to the first pole (pin 3) of the second winding 418 and a reference or potential GND via a voltage divider formed by a pair of resistors R30, R30A, and a diode CR31.

The circuit polarity is configured to act as a negative feedback loop where if the output voltage or potential VCC drops, the voltage output of the integration operational amplifier U1A will drop, causing an output current from the collector of the voltage to current transistor Q30 to increase. This increase in collector current of the voltage to current transistor Q30 delivers more energy to drive capacitor C32, turning ON the switching transistor Q32 with more base charge available, thereby increasing the ON time of switching transistor Q32 to thereby deliver more energy to transistor $T_{V-C}$ thereby completing the feedback path.

A feed forward voltage network may be formed by resistor R39 and capacitor C36 to feed-forward input voltage VIN from the input pin, terminal or note 202. Such may advantageously decrease the response time of the boost converter 410 to changes in the input voltage VIN.

Figure 6:
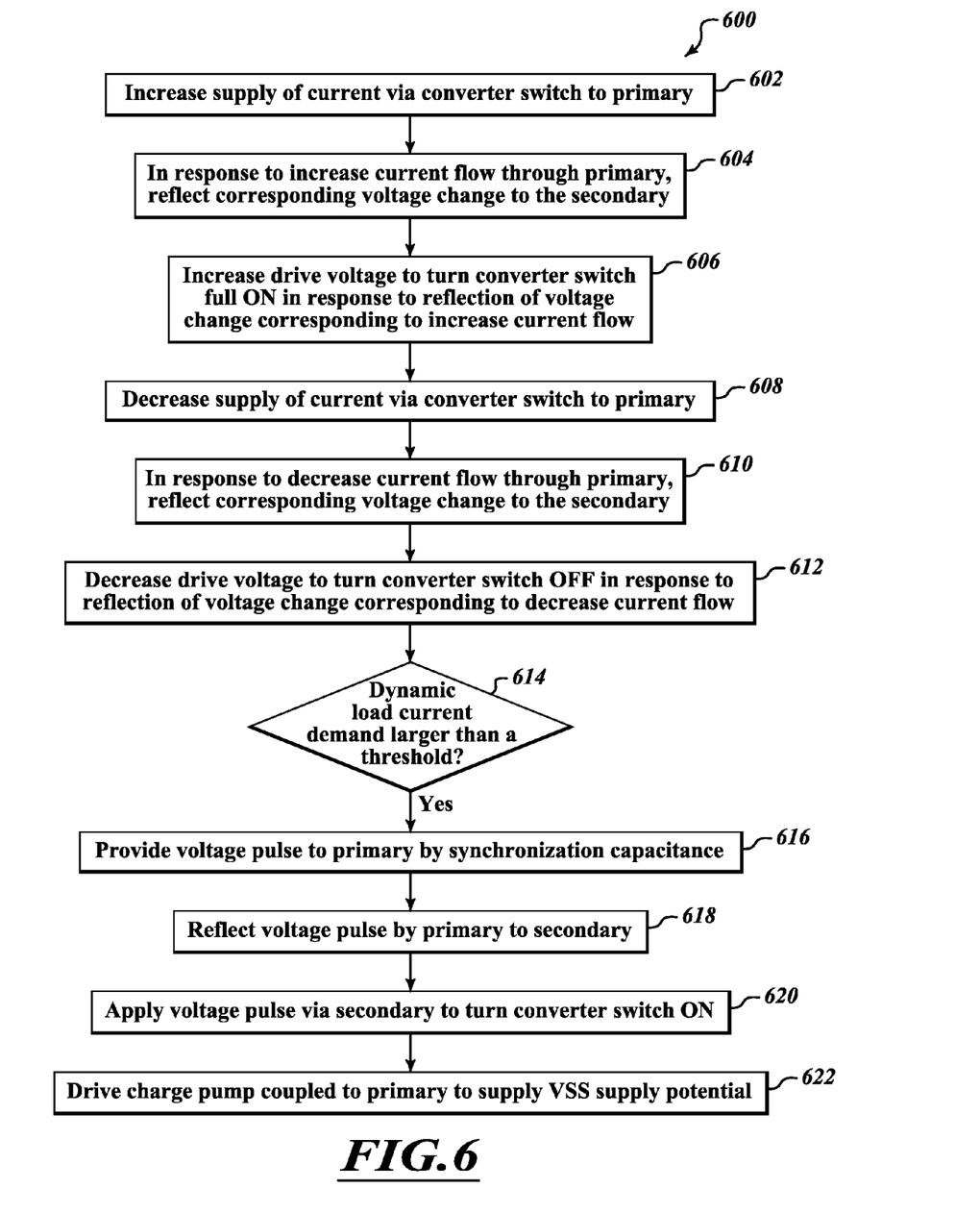
FIG. 6 shows a method of operating the auxiliary power supply or very or ultra low input voltage bias voltage supply of FIGS. 1-5, according to one illustrated embodiment.

FIG. 6 shows a method 600 of operating the auxiliary power supply or very or ultra low input voltage bias voltage supply 200 of FIGS. 1-5, according to one illustrated embodiment.

At 602, a converter switch increases a supply of current via to a first winding of a transformer. Such may be in response to a charge of the drive capacitor increasing.

At 604, in response to an increase current flow through first winding, the first winding reflects a corresponding voltage change to the second winding of the transformer.

At 606, in response to reflection of voltage change corresponding to increase current flow, the second winding increases a drive voltage to turn the converter switch full ON, as part of a positive feedback loop.

At 608, the converter switch decreases a supply of current to the first winding of the transformer. Such may be in response to a charge of the drive capacitor becoming depleted.

At 610, in response to a decrease current flow through first winding, the first winding reflects a corresponding voltage change to the second winding of the transformer.

At 612, in response to reflection of voltage change corresponding to decrease current flow, the second winding decreases a drive voltage, to turn the converter switch OFF.

At 614, a dynamic load current demand larger than a threshold is experienced.

At 616, in response to dynamic load current demand larger than a threshold, a synchronization capacitance provides a voltage pulse to the first winding of the transformer.

At 618, the first winding reflects the voltage pulse to the second winding of the transformer.

At 620, the second winding of the transformer applies the voltage pulse to turn converter switch ON.

At 622, a drive charge pump coupled to first winding supplies a VSS supply potential to an output node.

Figure 7:
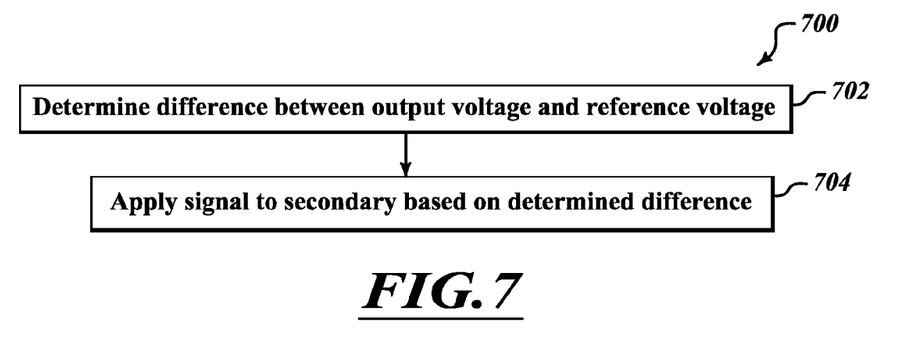
FIG. 7 shows a method of operating the auxiliary power supply or very or ultra low input voltage bias voltage supply of FIGS. 1-5, according to one illustrated embodiment, which may be implemented as part of performing the method of FIG. 6.

FIG. 7 shows a method 700 of operating the auxiliary power supply or very or ultra low input voltage bias voltage supply 200 of FIGS. 1-5, according to one illustrated embodiment. The method 700 may be implemented as part of performing the method 600 of FIG. 6.

At 702, an error circuit determines a difference between an output voltage and a reference voltage.

At 704, the error circuit applies a signal to second winding of the transformer based on determined difference to control the converter switch.

Figure 8:
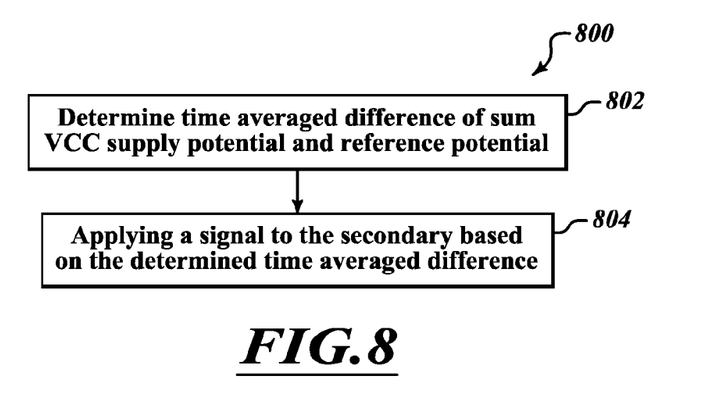
FIG. 8 shows a method of operating the auxiliary power supply or very or ultra low input voltage bias voltage supply of FIGS. 1-5, according to one illustrated embodiment, which may be implemented as part of performing the method of FIG. 6.

FIG. 8 shows a method 800 of operating the auxiliary power supply or very or ultra low input voltage bias voltage supply 200 of FIGS. 1-5, according to one illustrated embodiment. The method 800 may be implemented as part of performing the method 600 of FIG. 6.

At 802, an error circuit determines a time averaged difference of a sum of a VCC supply potential and a reference potential.

At 804, the error circuit applies a signal to the second winding based on the determined time averaged difference to control the converter switch.

This structures and methods described herein allow generation of regulated bias supply voltages for a device using a complete, step up switch mode dc-dc power converter can generates multiple bias voltages include positive (+) and negative (−) bias voltages that are greater than an input voltage and suitable for powering internal circuitry of a device that operates at very or ultra low input voltages (e.g., <2V). The structures and methods described herein are capable of generating bias voltages over a very wide temperature range and with a minimum number of parts. Traditional solutions incorporating linear regulator solutions as well as more complex circuitry solutions that provide regulated bias voltages are typically not able to operate at very or ultra low input voltages, are less efficient, and typically do not operate over as wide a temperature range.

While described above in the environment of a power converter, and in particular a switch mode DC/DC synchronous buck power converter, the auxiliary power supplies or bias voltage supplies described herein may be advantageously employed in a large variety of other environments. Such environments may include other types of DC/DC power converters (e.g., boost, buck-boost, flyback), whether isolated or non-isolated. Such may also include other types of power converters, including inverters (DC/AC). Such may also include many other types of non-power converter environments and equipment, which require bias or supply voltages or potentials, for example computing system.

The specific values, such as voltages, used herein are purely illustrative, and are not meant to be in anyway limiting on the scope. Likewise, the arrangements and topologies are merely illustrative and other arrangements and topologies may be employed where consistent with the teachings herein. While specific circuit structures are disclosed, other arrangements that achieve similar functionality may be employed. The terms switched mode and switch mode are used interchangeable herein and in the claims. The terms auxiliary power supply and bias voltage supply are used interchangeable herein and in the claims.

The methods illustrated and described herein may include additional acts and/or may omit some acts. The methods illustrated and described herein may perform the acts in a different order. Some of the acts may be performed sequentially, while some acts may be performed concurrently with other acts. Some acts may be merged into a single act or operation through the use of appropriate circuitry.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, including but not limited to commonly assigned U.S. patent applications:

Ser. No. 13/185,142, titled "POWER CONVERTER APPARATUS AND METHOD WITH COMPENSATION FOR LIGHT LOAD CONDITIONS";

Ser. No. 13/185,210, titled "INPUT CONTROL APPARATUS AND METHOD WITH INRUSH CURRENT, UNDER AND OVER VOLTAGE HANDLING";

Ser. No. 13/185,172, titled "POWER CONVERTER APPARATUS AND METHOD WITH COMPENSATION FOR CURRENT LIMIT/CURRENT SHARE OPERATION";

Ser. No. 13/185,152, titled "OSCILLATOR APPARATUS AND METHOD WITH WIDE ADJUSTABLE FREQUENCY RANGE"; and Ser. No. 61/508,937, titled "POWER CONVERTER APPARATUS AND METHODS";

all filed on Jul. 18, 2011, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A bias voltage supply to supply multiple regulated bias supply potentials to dynamic loads, comprising:
a DC/DC converter including a transformer having at least a first winding, a second winding and a core, the first winding coupled at a first node to receive an input at a first input potential and coupled at a second node to provide a first output potential and a second output potential with an output voltage which is higher than an input voltage supplied to the DC/DC converter, the DC/DC converter also including a converter switch operable to selectively couple the second node of the first winding to a ground reference node;
an error circuit coupled to control the converter switch through the second winding of the transformer based at least in part on a difference between the first output potential and a reference potential; and
a synchronization capacitance electrically coupled in parallel with the diode between the first winding and the VCC output node that in response to a dynamic load condition provides a signal that is reflected by the first winding across the transformer to the second winding to drive the converter switch to synchronize operation with a periodic load demand.

2. The bias voltage supply of claim 1 wherein the synchronization capacitance is supplied at least in part by a parasitic capacitance of an output diode electrically coupled between the second node of the first winding and a VCC output node and at least in part by a substrate capacitive coupling.

3. The bias voltage supply of claim 1 wherein the error circuit sums the first output potential and the reference potential and produces a time average of a difference between the first output potential and the reference potential.

4. The bias voltage supply of claim 3 wherein the error circuit produces a time average of a difference between the first output potential and the reference potential.

5. The bias voltage supply of claim 3 wherein the error circuit includes an error amplifier that sums the first output potential and the reference potential, and further comprising:
an integration capacitor that feeds back an output of the error amplifier to an input of the error amplifier.

6. The bias voltage supply of claim 5 wherein the error circuit includes a current mirror coupled to reflect an output of the error amplifier to the second winding of the transformer.

7. The bias voltage supply of claim 3 wherein the error circuit includes a bipolar voltage-to-current converter, a control capacitance, a unipolar voltage-to-current converter a drive capacitance, and a drive resistor, the bipolar voltage-to-current converter coupled to receive the sum of the first output potential and the reference potential and to charge the control capacitance, the unipolar voltage-to-current converter coupled to be driven by a potential of the control capacitance and to charge the drive capacitance, the drive capacitance coupled to drive the second winding of the transformer through the drive resistor.

8. The bias voltage supply of claim 7 wherein the unipolar voltage-to-current converter includes a transistor, a base diode and an emitter resistor, the transistor having a base coupled to a ground reference node via the base diode, an emitter coupled to the control capacitance via the emitter resistor, and a collector coupled to the drive capacitance.

9. The bias voltage supply of claim 1, further comprising:
a charge pump coupled to the second node of the first winding of the transformer to supply the second output potential.

10. The bias voltage supply of claim 9 wherein the first output potential is supplied at a VCC output node and wherein the charge pump includes a charge pump capacitor, a VSS output capacitor and a pair of charge pump diodes, a first one of the charge pump diodes coupled between the charge pump capacitor and a ground node and a second one of the charge pump diodes electrically coupled between the charge pump capacitor and a VSS potential output node, the VSS output capacitor electrically coupled between a first node between the first charge pump diode and the ground and a second node between the second charge pump diode and the VSS potential output node.

11. The bias voltage supply of claim 1, further comprising:
an over voltage clamp circuit coupled to turn OFF the converter switch in response to a transient condition in at least one of the first input potential or the first output potential.

12. The auxiliary voltage supply of claim 1 wherein the transformer includes at least a third winding to supply a third output potential which is different than the first and the second potentials.

13. An auxiliary voltage supply to supply a VCC supply potential and a VSS supply potential to dynamic loads, comprising:
a transformer having at least a first winding, a second winding and a core;
a converter switch operable to selectively couple the first winding to a ground reference node;
a drive capacitance coupled to drive the converter switch; and
a synchronization capacitance,
wherein the transformer, the converter switch and the drive capacitance are coupled in a positive feedback loop such that as a current flow through the first winding via the converter switch increases, the first winding reflects a corresponding voltage change to the second winding that increases a drive voltage to turn the converter switch full ON and as current flow through the first winding via the converter switch decreases, the first winding reflects a corresponding voltage change to the second winding that decreases the drive voltage to turn the converter switch full OFF; and wherein the transformer, the converter switch and the synchronization capacitance are coupled such that in response to a dynamic load current demand larger than a threshold the first winding reflects a voltage pulse to the second winding to turn the converter switch ON to synchronize a cycle of the bias voltage supply.

14. The auxiliary voltage supply of claim 13 wherein the synchronization capacitance is supplied at least in part by a parasitic capacitance of an output diode electrically coupled between the first winding and a VCC output node.

15. The auxiliary voltage supply of claim 14 wherein the synchronization capacitance is supplied at least in part by a parasitic substrate capacitive coupling.

16. The auxiliary voltage supply of claim 13, further comprising:

an error circuit coupled to control the converter switch through the second winding of the transformer based at least in part on a difference between an output voltage and a reference voltage.

17. The auxiliary voltage supply of claim 16 wherein the error circuit produces a time averaged difference of the sum of the VCC supply potential and a reference potential.

18. The auxiliary voltage supply of claim 13 wherein the transformer includes at least a third winding.

19. A method of operating an auxiliary voltage supply to supply a VCC supply potential and a VSS supply potential to dynamic loads, the auxiliary voltage supply comprising a transformer having at least a first winding, a second winding and a core; a converter switch operable to selectively couple the first winding to a ground reference node; a drive capacitance coupled to drive the converter switch; and a synchronization capacitance, the method comprising:

increasing a supply of current via the converter switch to the first winding of the transformer;

in response to an increase in current flow through the first winding via the converter switch, reflecting a corresponding voltage change by the first winding to the second winding;

increasing a drive voltage to turn the converter switch full ON in response to the reflection of the voltage change corresponding to the increase in current flow through the first winding;

decreasing the supply of current via the converter switch to the first winding of the transformer;

in response to the decrease in current flow through the first winding via the converter switch, reflecting a corresponding voltage change by the first winding to the second winding;

decreasing a drive voltage to turn the converter switch OFF in response to the reflection of the voltage change corresponding to the decrease in current flow through the first winding;

in response to a dynamic load current demand larger than a threshold, providing a voltage pulse to the first winding by the synchronization capacitance;

reflecting the voltage pulse by the first winding to the second winding; and applying the voltage pulse via the second winding to turn the converter switch ON to synchronize a cycle of the bias voltage supply.

20. The method of claim 19, further comprising:

determining a difference between an output voltage and a reference voltage; and applying a signal to the second winding based on the determined difference.

21. The method of claim 19, further comprising:

determining a time averaged difference of a sum of the VCC supply potential and a reference potential; and applying a signal to the second winding based on the determined time averaged difference.

22. The method of claim 19, further comprising:

driving a charge pump coupled to the first winding of the transformer to supply the VSS supply potential.

* * * * *